United States Patent

Garland et al.

[11] Patent Number: 5,905,784
[45] Date of Patent: May 18, 1999

[54] METHOD FOR SILENTLY ALERTING INBOUND-ONLY TELEMETRY INTERFACE UNITS

[75] Inventors: Stuart Mandel Garland, Morton Grove; David B. Smith, Hinsdale, both of Ill.

[73] Assignee: Lucent Technologies Inc., Murray Hill, N.J.

[21] Appl. No.: 08/756,839

[22] Filed: Nov. 26, 1996

[51] Int. Cl.$^6$ .............................. H04M 11/00; H04M 1/24
[52] U.S. Cl. ................................. 379/106.09; 379/93.28; 379/6; 379/93.05
[58] Field of Search .............................. 379/90.01, 92.01, 379/92.03, 92.04, 93.01, 93.05, 93.12, 93.14, 106.09, 106.01, 106.11, 27–28, 29, 5, 6, 93.28; 455/2

[56] References Cited

U.S. PATENT DOCUMENTS

| | | | |
|---|---|---|---|
| 4,724,435 | 2/1988 | Moses et al. | 340/870 |
| 5,243,644 | 9/1993 | Garland et al. | 379/106 |
| 5,359,641 | 10/1994 | Schull et al. | 379/106 |
| 5,394,461 | 2/1995 | Garland | 379/106 |
| 5,509,054 | 4/1996 | Garland | 379/106 |
| 5,535,267 | 7/1996 | Schull | 379/106 |
| 5,583,923 | 12/1996 | Hoy et al. | 379/106 |

*Primary Examiner*—Paul Loomis
*Attorney, Agent, or Firm*—Dennis J. Williamson; John W. Hayes

[57] ABSTRACT

The system of the invention consists of a central office service unit (COSU) connected to a plurality of switching systems via dedicated telemetry trunks or a common channel signaling network such as the CCS7 network. The switching systems are connected to a plurality of inbound-only TIUs located on the customer premise that are in turn connected to customer devices such as utility meters, appliances, security systems or the like. The TIUs are inbound-only that can originate calls but cannot answer calls initiated by the controlling entity. A controlling entity, such as a utility, is connected to one of the switching systems over a customer line such that the controlling entity can be connected to any TIU hosted by the switching systems. The controlling entity requests that an alerting tone be sent by the COSU to a desired TIU. The COSU, as is known in the art, delivers an alert tone through a suppressed ringing connection to the TIU that does not audibly ring the customer's telephone. The TIU does not "answer" this tone by going off hook such that no connection is established and the telemetry call is taken down. While the TIU does not answer the alert tone, the tone alerts the TIU to perform one or more functions such as retrieve data from a utility meter, check the status of an appliance or the like. As an alternative to the alert tone, a digital signal can be transmitted to alert the TIU. After performing the desired function, the TIU is programmed to call the controlling entity and a connection is established between the TIU and the controlling entity. The TIU can then transmit the results of the function to the controlling entity and the controlling entity can download further instructions, programs or the like to the TIU.

12 Claims, 2 Drawing Sheets

METHOD FOR SILENTLY ALERTING INBOUND-ONLY TELEMETRY INTERFACE UNITS

BACKGROUND OF THE INVENTION

The invention relates, generally, to telemetry systems and, more particularly, to a system for silently alerting inbound-only intelligent communication devices (ICDs) such as telemetry interface units (TIUs), meters, diagnostic processors or the like to facilitate diagnostic, control and data exchange functionality.

It will be appreciated that telemetry systems typically consist of TIUs or other ICDs located on the customer premises where each TIU or ICD is connected to a switching system in the telecommunications network over a customer line such that the TIUs or ICDs can be accessed via the telephone network. One common telemetry system is used to remotely monitor utility usage. The system consists of an "intelligent" utility meter located at the customer premise that records utility usage and communicates with a TIU. The controlling utility establishes a connection with the TIU and the TIU gathers usage data from the utility meter and transmits this information to the utility for billing purposes, usage monitoring or the like. While utility meter reading is a common telemetry application, it will be appreciated that telemetry systems can be used to perform any remote monitoring, measuring, control or diagnostic function.

Different types of TIUs, and associated telemetry systems, have been developed. One known type of TIU is known as an inbound-only TIU. An inbound-only TIU is typically programmed, based upon a stored instruction set, to collect data from a customer device (or to perform a monitoring, diagnostic or control function) and to periodically initiate a call to the entity responsible for controlling the TIU and/or customer device to transfer data or otherwise communicate with the controlling entity. These types of inbound-only TIUs are capable of initiating a call to the controlling entity (inbound communications) but cannot go off-hook to "answer" or complete a connection initiated by the controlling entity. As a result, these inbound-only TIUs cannot be accessed by the controlling entity unless and until the TIU initiates the call.

Some inbound-only TIUs can be alerted by a power ringing alert from the controlling entity. In response to the power ringing alert, the TIU initiates a call to the controlling entity. Typically, the controlling entity makes a standard voice call to the customer premise where the TIU is located and verbally informs the customer that a telemetry "alert" is about to be made to that customer's TIU. The controlling entity then makes a power ringing alert to the customer premise where the TIU is alerted by a power ringing alert that is audible to the customer. Typically, the TIU is alerted after receiving a fixed number of power ringing cycles. As will be appreciated, the audible power ringing alert is extremely disruptive to the customer. As a result, such systems are typically not used at night, when the audible power ringing alert would most disturb the customer even though this is typically the time of day that the telemetry call is least likely to interfere with the customer's regular voice calls. Moreover, it is possible that the TIU will be alerted inadvertently should someone other than the controlling entity call the customer line and inadvertently deliver the power ringing alert signal with the correct fixed number of power ringing cycles. It is also possible that after a number of ringing cycles, but before the fixed number of ringing cycles alerts the TIU, the customer's line may be forwarded to a voice mail system thereby terminating the power ringing before the TIU is alerted.

In addition to the above-discussed inbound-only TIUs, outbound TIUs also exist. Outbound TIUs are capable of answering calls initiated by the controlling entity such that a connection between the controlling entity and the TIU is created at the initiation of the controlling entity. These TIUs provide the advantage that the controlling entity can establish a connection at its initiation at any time. One such outbound system is disclosed in U.S. Pat. No. 5,189,694 issued to Garland on Feb. 23, 1993. This system discloses the use of a suppressed ringing connection where no audible ringing signal is delivered to the customer premise when the alert tone is transmitted to the TIU. Because the TIU answers the tone from the controlling entity and a connection is established between the TIU and the controlling entity, a connection is made every time the controlling entity contacts the TIU. In some circumstances, in response to the initial alert by the controlling entity, the TIU must perform a function such as data retrieval, diagnostics or the like. In such a situation, the connection between the controlling entity and the TIU must either be maintained while the TIU and other related components perform the function or the connection must be terminated while the TIU and other related components perform the function and a second connection must be established later to transmit the data. In either event, network resources are used inefficiently and additional billing charges for the connection time may be incurred by the controlling party.

Thus, a more efficient telemetry system is desired.

SUMMARY OF THE INVENTION

In a preferred embodiment, the system of the invention consists of a central office service unit (COSU) connected to a plurality of switching systems via dedicated telemetry trunks or a common channel signaling network such as the SS7 network. The switching systems are connected to a plurality of inbound-only TIUs located on the customer premise that are in turn connected to customer devices such as utility meters, appliances, security systems or the like. The TIUs are inbound-only TIUs in that they can originate calls but cannot answer calls initiated by the controlling entity. A controlling entity, such as a utility, is connected to one of the switching systems over a customer line to the COSU such that the controlling entity can be connected to any TIU hosted by the switching systems. The controlling entity requests that an alerting tone be sent by the COSU to a desired TIU. The COSU, as is known in the art, delivers an alert tone through a suppressed ringing connection to the TIU that does not audibly ring the customer's telephone; however, the TIU does not "answer" this tone by going off hook such that no connection is established and the telemetry call is taken down. While the TIU does not answer the alert tone, the tone alerts the TIU to "wake up" and perform one or more functions such as to retrieve data from a utility meter, check the status of an appliance or the like. Different alert tones can be used to request the TIU to take alternative actions or to establish one of a number of call back options. After performing the desired function, the TIU is programmed to call the controlling entity and a connection is established between the TIU and the controlling entity. The TIU can then transmit the results of the function to the controlling entity and the controlling entity can download further instructions, programs or the like to the TIU.

DETAILED DESCRIPTION

Figure 1:
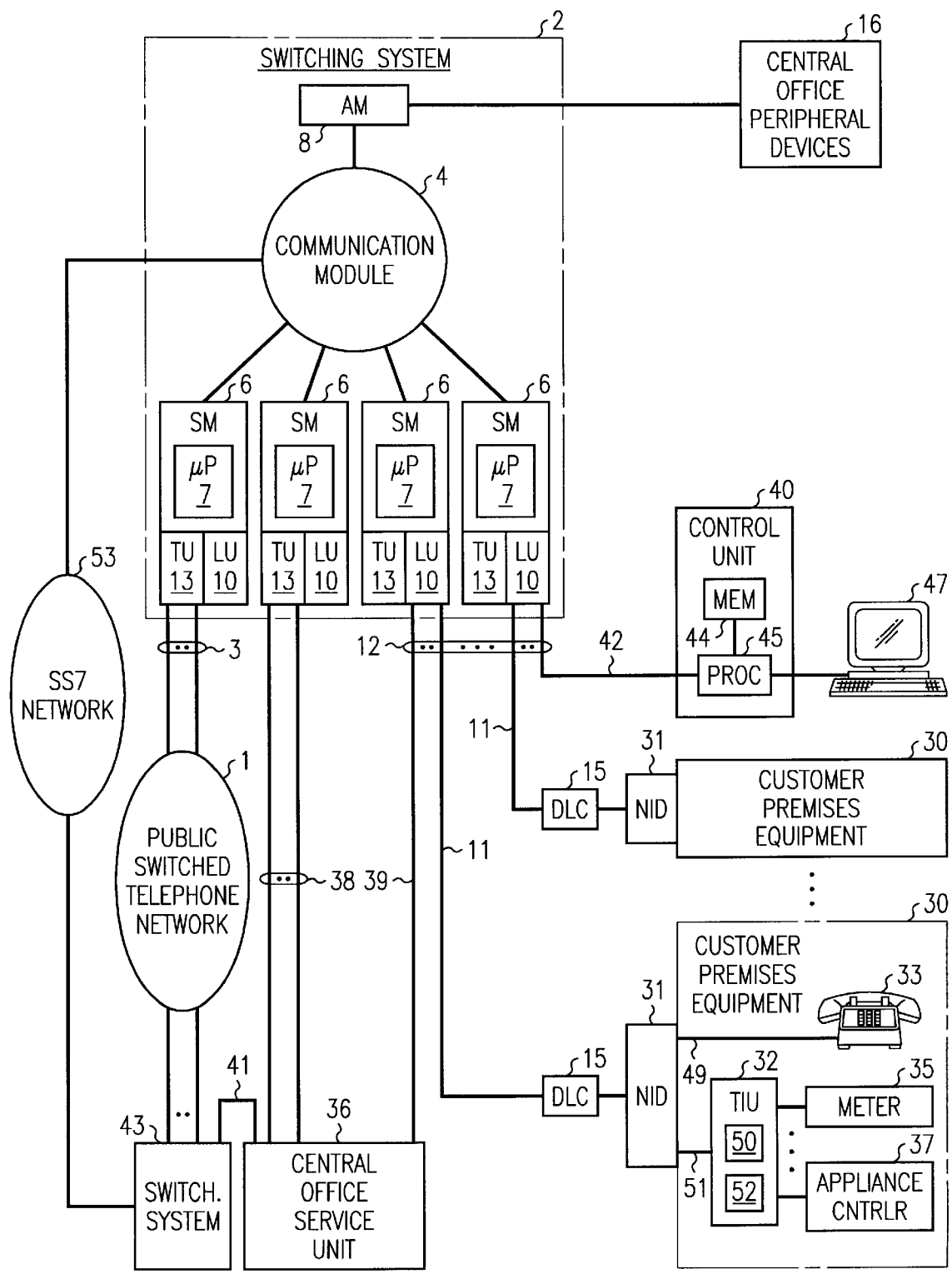
FIG. 1 is a block diagram showing the system of the invention.

The system of the invention is used in a public switched telecommunications network such as is illustrated in FIG. 1 and consists of a plurality of switching systems connected to one another in the public switched network 1 over inter-office trunks 3 as is well understood. Referring to switching system 2, each switching system can consist of one of the family of 5ESS® switches manufactured and sold by Lucent Technologies Inc. and described in U.S. Pat. No. 4,592,048 issued to Beckner et al. on May 27, 1986 and in *AT&T Technical Journal*, Vol. 64, No. 6, Part 2, pp. 1305–1524, or any other similar switching system. Switching system 2 operates as is well known in the art to switch voice and data through the network. The architecture of such a switching system is shown and includes a communication module 4 forming a hub and having a plurality of switch modules 6, and an administration module 8 emanating therefrom. Each switch module 6 is controlled by microprocessor 7 and provides call processing, space division switching, and signaling for the lines and trunks to which it is connected. Line units 10 provide interface to the local loops 12 that connect to the customer premise equipment and trunk units 13 provide interface to the trunks 3 that connect to other switches in the network. The administration module 8 provides functions that can be centralized such as maintenance control, craft interface, text and data base management, call routing and time slot allocation. The administration module 8 consists of a control unit such as the AT&T 3B21D duplex processor and a main memory. In some switching systems, the administration module is assisted by a separate processor that performs some administrative functions. The administration module 8 also includes an input/output processor providing communication between the switching system 2 and central office peripheral devices 16 such as terminals, printers and the like. Communication module 4 is the hub of the switching system and allows communication between the administration module 8 and the switch modules 6. Communication module 4 consists of a message switch that provides the administration module-to-switch module and switch module-to-switch module message communication, and a time multiplexed switch providing the switch module-to-switch module and switch module-to-administration module time slot connection for voice and data communication and the clock distribution. While the architecture of one particular switching system has been shown and described, it will be understood that any similar switching system can be used.

The local loops 12 typically consisting of a pair of copper wires, coaxial cables, fiber or any similar transmission member defining local lines 11 that connect switch 2 to customer premise equipment (CPE) 30 such as telephones, utility meters, appliances, multimedia equipment, terminals or the like. One arrangement of the local loop is illustrated where the transmission member is terminated at a network interface device 31. Telephone set 33 and a telemetry interface unit (TIU) 32 are connected to the network interface device 31 over a first wire pair 49 and second wire pair 51, respectively. Alternatively, the telephone set 33 could be arranged in series with TIU 32, and the customer devices 35 and 37 if desired. The local loops may also include digital loop carrier systems 15 such as the SLC® series of carriers manufactured and sold by Lucent Technologies Inc.

TIU 32 is a processor or hard logic controlled device that includes a processor 50 and memory 52. Memory 52 stores a program for controlling the communication of TIU 32 with both the switching system 2 and the customer devices 35 and 37. Specifically, upon being "awakened" by the alert tone from switching system 2, the appropriate routine (i.e., the routine associated with the specific alert tone) is run by processor 50 to control the functions of the customer device. As an alternative to the alert tone a digital signal can be used to alert the TIU where a TIU that responds to a digital signal is used.

A central office service unit (COSU) 36 is connected to the switch 2 over one or more utility telemetry trunks (UTT) 38 and by a dial up or dedicated line 39. Moreover, the COSU functionality could be integrated into one of the switching systems in the network rather than being a stand alone unit. A controlling entity's control unit 40 consisting of a processor 45 and memory 44 is also connected to the switching system 2 over a dedicated or dial up line 42. Control unit 40 may include an interface such as a keyboard and monitor 47 as will be understood. The controlling entity can consist of a utility, security company, appliance repair company or any entity having a need to remotely monitor or communicate with any of the customer premise equipment. As will be appreciated, line 42 can be connected to line 39 through the switch fabric of switching system 2 in the same manner as voice and data connections to allow control unit 40 to communicate with COSU 36. As explained in detail in U.S. Pat. No. 5,189,694 issued to Garland on Feb. 23, 1993; U.S. Pat. No. 5,243,644 issued to Garland et al. on Sep. 7, 1993; U.S. Pat. No. 5,394,461 issued to Garland on Feb. 28, 1995; and U.S. Pat. No. 5,327,488 issued to Garland on Jul. 5, 1994, COSU 36 and UTT 38 are used to make a suppressed ringing connection between, for example, a utility and a utility meter located in the home to allow the utility to determine service usage by a customer. The system of the invention uses the suppressed ringing connection to allow the control unit 40 to cause the COSU to alert any TIU 32 hosted by switching system 2 such that the control unit and CPE communicate with one another without an audible signal being displayed or heard at the customer premise. While such a suppressed ringing connection has previously been used to allow a utility to initiate a connection with an outbound TIU, it has not been used for silently alerting an inbound-only TIU to cause a function to be performed.

COSU 36 can be connected to more than one switching system as illustrated in FIG. 1 where another UTT 41 connects the COSU to an additional switching system 43. Alternatively, a common channel signaling network such as SS7 can be used to connect COSU 36 to a second switching system 43 through the SS7 network 53. As a result, the controlling entity's unit 40 can be connected to TIUs hosted by different switching systems in the network. COSU 36, as is known, creates a one to many connection in which line 39 (which is switch connected to line 42) can be connected to a plurality of UTTs 38. In this manner, the COSU serves to multiplex and demultiplex the signals as they are transmitted between line 39 and UTTs 38 that, in turn, are connected to a multiplicity of local lines 11 that connect to CPE 30.

Figure 2:
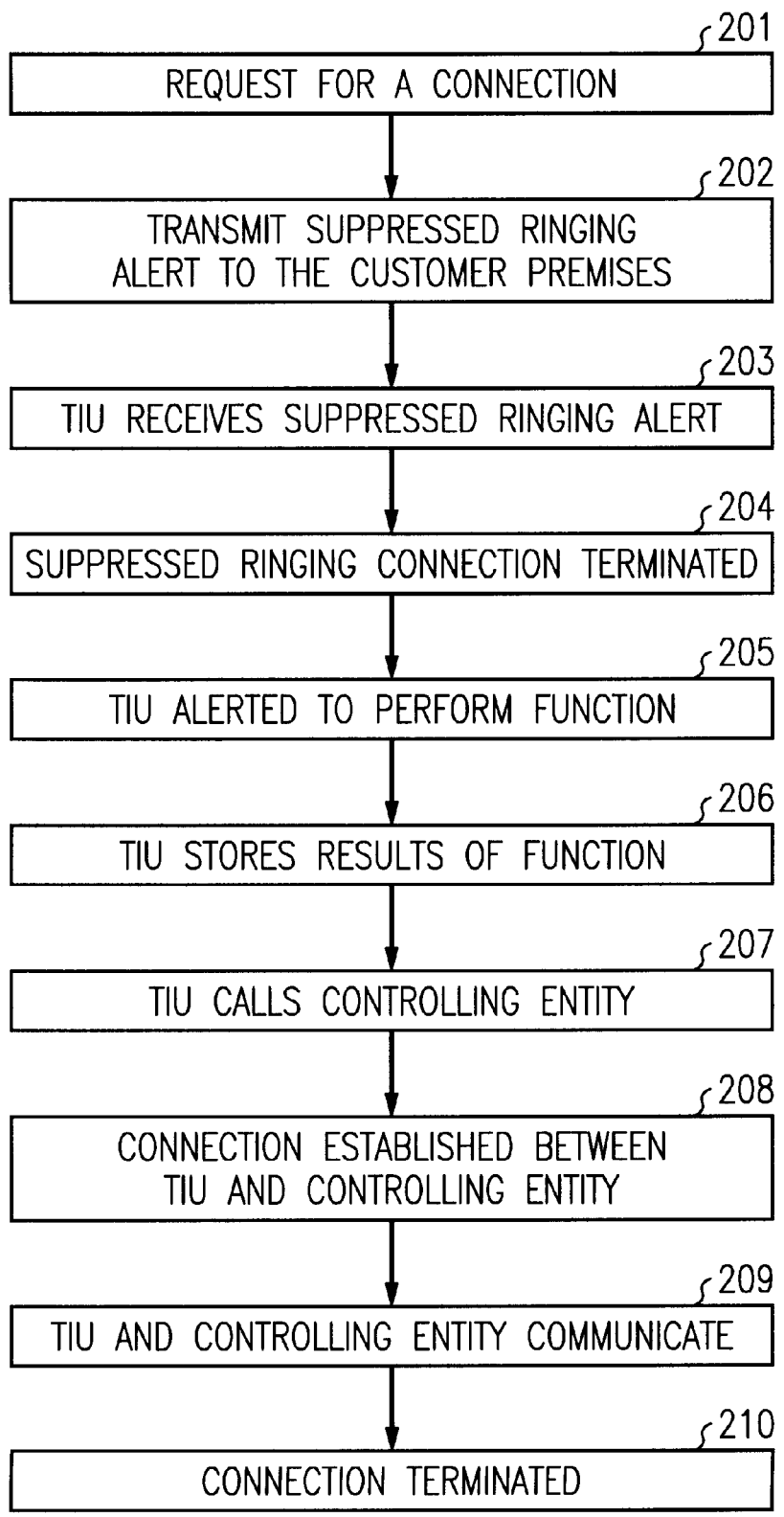
FIG. 2 is a flow chart describing the method of operation of the system of the invention.

Referring more particularly to FIG. 2, the operation of the system will be described. When the controlling entity determines that it wishes to contact one of the ITUs, it makes a request for a connection to switching system 2 (block 201). The request for the connection can be made manually or automatically. For example, processor 40 of the controlling entity can be programmed to automatically initiate the call at predetermined time intervals (i.e. monthly, hourly etc.) or the request can be made manually via interface 47 such as from a customer service station. The request for a connection includes a unique identifier that identifies the TIU being called. The identifier could be the customer's telephone number or it could be another identifier such as the serial number of the TIU being called. If an identifier other than a telephone number is used, a translation between the identifier and the telephone number of the customer being called is made in a data base that is accessible by the switching system.

The COSU 36 receives the request for connection from the controlling entity via the switch fabric of switching system 2 and the COSU transmits the request to the switching system. The switching system responds to the request for connection by creating a suppressed ringing connection where a silent alert tone is transmitted to the customer premise (block 202). Alternatively, a digital signal rather than a tone can be transmitted over the suppressed ringing connection to the customer premise if the TIU is digitally activated. In those architectures where the COSU is integrated in the switching system, the switching system alerts the CPE. Note, the suppressed ringing connection could also include abbreviated ringing such as disclosed in U.S. Pat. Nos. 5,243,644 and 5,452,343 issued to Garland et al. to allow the tone to pass through digital loop carriers 15 that are commonly found serving subscriber lines. The alert tone or signal is received at the TIU (block 203); however, the TIU does not go off-hook to complete the connection. Because the TIU does not go off-hook, the connection is not completed and the switching system tears down the suppressed ringing connection after a predetermined time (block 204). The predetermined time may be determined from a service record or on a per call basis.

While the TIU does not go off-hook in response to the suppressed ringing connection, the digital signal or tone alerts the TIU that it must perform a diagnostic, control or data retrieval function (block 205). Depending on the TIU, the TIU could be capable of performing only a single function in which case, in response to the tone, the TIU runs the program stored in memory 52 and performs that function. Some TIUs are capable of performing a wide variety of functions in conjunction with the customer devices to which they are connected. For example, the customer device could consist of a processor controlled appliance 37 where the appliance's processor performs a series of diagnostic tests on the appliance. The results of the tests are transmitted to the TIU and stored in memory 52 for transmission to the controlling entity via the network. The same TIU could also be connected to a medical device that monitors a person's vital signs, to a plurality of controllable devices such as a furnace, air conditioner, sprinkler system, security system, office equipment or the like, to a utility meter 35 and/or to any customer device. In such a situation, the tone and/or tone duration and pattern generated by the switching system will vary depending upon the customer device to be accessed and the function to be performed. The tone alert is defined by three parameters: 1) frequency, 2) duration and 3) pattern (on-off sequences) that can be manipulated to alter the alert tone received by the TIU. For example, a first tone will be recognized by the TIU as a request to access the medical monitor, a second tone will be recognized by the TIU as a request to diagnose the appliance and a third tone will be to control the furnace, air conditioner and sprinkler system. Alternatively, as described in U.S. Pat. No. 5,509,054 issued to Garland a subaddress could be used in conjunction with an alert tone to identify the targeted device. Where subaddressing is used, the TIU can be designed to function as either an inbound or outbound device. A subaddress can be designated as causing the TIU to perform as an inbound-only TIU for a particular function where the TIU responds to the alert signal by performing a function and then initiating a call back to the control unit. Moreover, where a digital signal alert is used the bit stream can be controlled to instruct the TIU to perform different functions in place of the variable tone alert.

The results of the function performed by TIU 34 are stored in memory 52 (block 206). After the desired functions are performed, the TIU initiates a call to the controlling entity by dialing that entity's telephone number (block 207). The controlling entity answers the call and a connection is established between the TIU and the processor of the controlling entity (block 208). The TIU then transfers the collected data stored in memory 52 to the control unit 40 and, if desired, the control unit 40 can download new or revised instructions to the TIU (block 209). The connection is then ended either by the controlling entity or TIU (block 210).

It will be appreciated that the system of the invention allows communication between an inbound-only function of the TIU and the controlling entity without disturbing the occupants of the customer premise by using the suppressed ringing connection and silent alert. The system is particularly useful where the functions performed by the TIU and/or customer devices are relatively time consuming because no connection is established until the functions are completed. Thus, network resources are not used and the controlling customer does not incur charges during the performance of the TIU's functions.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method for communicating information between a customer premise and a remote entity comprising the steps of:

generating a suppressed ringing connection at a switching system in response to a request from said entity;

transmitting an alert to the customer premise over the suppressed ringing connection;

receiving said alert at an interface unit at the customer premise;

terminating said suppressed ringing connection;

in response to the receiving of said alert at the interface unit, performing a function at said customer premise, said function generating information that is stored at said interface unit;

after performing said function, automatically initiating a request for a connection at said interface unit to said entity;

establishing a connection between the interface unit and said entity via said switching system; and after establishing said connection, transmitting the information to said entity.

2. The method of claim 1, further including the step of transmitting further information from said entity to said interface unit.

3. The method of claim 2, wherein the step of transmitting said further information includes downloading a program to be executed by said TIU.

4. The method of claim 1, wherein said step of performing a function includes the step of retrieving data from customer equipment.

5. The method of claim 1, wherein said step of performing a function includes the step of performing diagnostic tests.

6. The method of claim 1, wherein the step of automatically initiating a request for a connection includes the step of requesting said connection after a predetermined time period.

7. The method of claim 1, wherein said alert consists of one or more alert tones.

8. The method of claim 7, wherein the step of performing a function is controlled by transmitting different alert tones.

9. The method of claim 8, wherein the different alert tones are generated by changing the frequency, duration or pattern of the alert tone.

10. The method of claim 7, wherein the step of initiating a request for a connection is controlled by transmitting different alert tones.

11. The method of claim 1, wherein said alert consists of a digital signal.

12. The method of claim 11, wherein the steps of performing a function and initiating a request for a connection are controlled by said digital signal.

* * * * *